United States Patent [19]
Arai et al.

[11] Patent Number: 5,449,416
[45] Date of Patent: Sep. 12, 1995

[54] COLD ACCUMULATING MATERIAL AND METHOD OF MANUFACTURING THE SAME

[75] Inventors: Tomohisa Arai; Naoyuki Sori; Masashi Sahashi, all of Yokohama; Yoichi Tokai, Urayasu, all of Japan

[73] Assignee: Kabushiki Kaisha Toshiba, Kawasaki, Japan

[21] Appl. No.: 383,655

[22] Filed: Feb. 3, 1995

Related U.S. Application Data

[60] Continuation of Ser. No. 993,677, Dec. 21, 1992, abandoned, which is a division of Ser. No. 558,484, Jul. 27, 1990, Pat. No. 5,186,765.

[30] Foreign Application Priority Data

Jul. 31, 1989 [JP] Japan .................. 1-196870

[51] Int. Cl.$^6$ .............................. H01F 1/053
[52] U.S. Cl. .................. 148/301; 148/302; 420/83; 420/416
[58] Field of Search ............. 148/301, 302; 420/416, 420/83; 62/3.1, 6

[56] References Cited

U.S. PATENT DOCUMENTS

| | | | |
|---|---|---|---|
| 3,558,372 | 1/1971 | Becker | 148/301 |
| 4,354,355 | 10/1982 | Lawless | 62/6 |
| 4,801,340 | 1/1989 | Inoue et al. | 148/103 |
| 4,849,017 | 7/1989 | Sahashi et al. | 420/416 |
| 5,162,064 | 11/1992 | Kim et al. | 148/302 |

FOREIGN PATENT DOCUMENTS

| | | | |
|---|---|---|---|
| 0311049 | 4/1989 | European Pat. Off. | 148/302 |
| 0327293 | 8/1989 | European Pat. Off. | 62/3.1 |
| 310269 | 12/1989 | Japan . | |
| 1310269 | 12/1989 | Japan . | |
| 309158 | 12/1990 | Japan . | |
| 31050 | 7/1991 | Japan . | |
| 3177083 | 8/1991 | Japan . | |

OTHER PUBLICATIONS

"The Radio Wave" (a newspaper named Denpa Shimbun), Nov. 18, 1988.

*Primary Examiner*—John Sheehan
*Attorney, Agent, or Firm*—Oblon, Spivak, McClelland, Maier & Neustadt

[57] ABSTRACT

The extremely low temperature cold accumulating material for use in refrigerators, for example, comprises particles containing at least one kind of rare earth element selected from a group consisting of Y, La, Ce, Pr, Nd, Pm, Sm, Eu, Gd, Tb, Dy, Ho, Er, Tm, and Yb. The proportion of particles each having a particle size of 0.01 to 3 mm is 70% or greater by weight with respect to the whole particles and the proportion of particles each having a shape such that the ratio of the major diameter to the minor diameter is not greater than 5 is 70% or greater by weight with respect to the whole particles. The particles are manufactured by quenching and solidifying a molten metal containing at least one kind of rear earth element described above. The thus manufacured extremely low temperature cold accumulating material is improved in cold accumulating efficiency and is specifically improved in mechanical strength and in chemical stability.

6 Claims, 11 Drawing Sheets

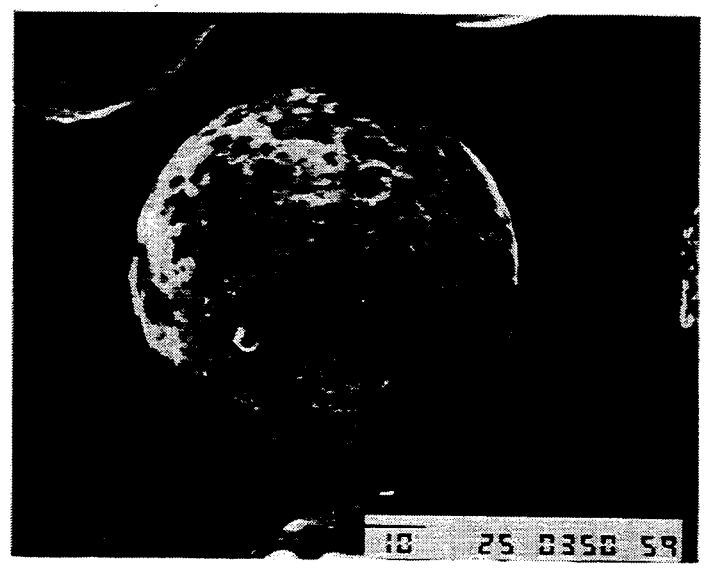
FIG. 10A
PRIOR ART
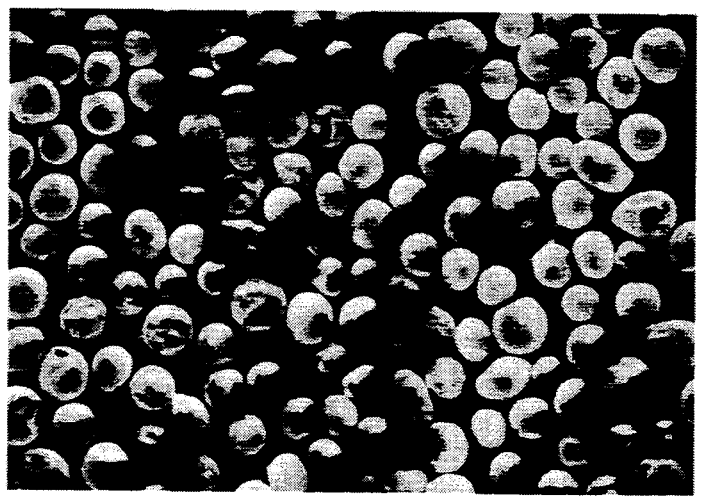
FIG. 10B   100μm
PRIOR ART

COLD ACCUMULATING MATERIAL AND METHOD OF MANUFACTURING THE SAME

This application is a Continuation of application Ser. No. 07/993,677, filed on Dec. 21, 1992, now abandoned, which is a Division of application Ser. No. 07/558,484, filed on Jul. 27, 1990, now U.S. Pat. No. 5,186,765.

BACKGROUND OF THE INVENTION

The present invention relates to a cold accumulating material for accumulating extremely low temperature cold used in refrigerators and the like and to a method of manufacturing this kind of cold accumulating material. More particularly, the present invention relates to an extremely low temperature cold accumulating material improved in mechanical strength and in chemical stability, having sufficient resistance to thermal shock and vibrations applied during operation and free from the risk of pulverizing into fine particles to make aeration of the refrigerant difficult, and relates to a method of manufacturing this cold accumulating material.

Recently, the superconduction technology has been remarkably developed for wide application to magnetic floating trains, stratigraphy diagnosis apparatus based on nuclear magnetic resonance, and the ultra high vacuum technology also has been developed for application to cryopumps for VLSI pattern transfer apparatus. With the coming of an era in which the super low temperature technology will be put into practical use, the development of smaller high-performance refrigerators for practical use is being promoted. In particular, the importance of refrigeration/cooling technology for providing an atmosphere at about the absolute zero degree ($-273°$ C.) in which superconducting electromagnets and high vacuum forming cryopumps for semiconductor manufacture apparatus can operate is increasing, and the provision of refrigerators improved in reliability as well as in characteristics is expected.

Conventionally, for superconducting MRI (nuclear magnetic resonance imaging) apparatus for taking straitigraphic photographs in medical fields, a Gifford-MacMahon type of small helium refrigerator (GM refrigerator), for example, is employed to cool a superconduction electromagnet by using liquid helium.

The GM refrigerator has a construction based on a combination of a compressor for compressing He gas, an expansion unit for expanding the compressed He gas and a cold accumulating unit for maintaining the cooled state of the He gas cooled in the expansion unit. The GM refrigerator effects cooling by expanding He gas compressed with a compressor in about 60 cycles per minute to cool the cooled system through an extreme end portion of the expansion unit.

Ordinarily, cold accumulating units of conventional refrigerators are constructed by packing at a high density a granular cold accumulating material mainly constituted by copper or lead as a main constituent or by packing multiple layers of meshlike cold accumlating members.

However, the volumetric specific heat of such a cold accumulating material or member formed of copper or lead abruptly decreases in the extremely low temperature range below 20 K. ($-253°$ C.), as shown in FIG. 8A. It is difficult to reduce the ultimate cooling temperature by using such a material. That is, where lead is used, the cold accumlating effect is lost in the temperature range below 10 K. ($-263°$ C.). Thus, the lowest temperature attainable with the conventional cold accumulating materials is considered to be 10 to 9 K.

The inventors of the present invention have eagerly studied to solve this problem, have developed a cold accumulating material having a large volumetric specific heat in an extremely low temperature range, and proposed this material in Japanese Patent Application No. 63-21218.

The cold accumulating material packed in the low temperature heat accumulator of this application is formed of a magnetic material which is a chemical compound constituted by a rare earth element and Ni, Co or Cu and having a large volumetric specific heat in an extremely low temperature range.

It was found that specifically erbium 3 nickel (Er-Ni$_{1/3}$ also represented is Er$_3$Vi) has a volumetric specific heat generally equal to that of lead in the temperature range of ordinary temperature down to 15 K. ($-258°$ C.) but has a specific heat characteristics superior than that of lead in the extremely low temperature range below 15 K, as shown in FIG. 8A.

Ordinarily, conventional cold accumulating materials formed of such magnetic materials have been manufactured by a plasma spray gun apparatus such as that shown in FIG. 9.

This plasma spray gun apparatus 100 forms a plasma jet 105 of argon gas 104 by utilizing an arc discharge between an anode 102 and a cathode 103 and is supplied to a powdery raw material 106 which has been previously formed from ingot by mechanical pulverization so as to have a predetermined particle size. A surface portion or the whole of each particle of the supplied powdery raw material 106 is melted by heating it with the plasma and is simultaneously dispersed by the plasma jet 105. Each raw material particle is rapidly cooled and solidified while flying through a vacuum chamber 107 to be formed into the shape of a spherical particle 108.

This rounding enables the cold accumulating material to be packed in the cold accumulating unit at a large density.

Cold accumulating material particles prepared by the conventional plasma spray method, however, are essentially formed of a brittle intermetallic compound formed from a rare earth element and a metal such as nickel and have fine irregularities in their surfaces from which make the particles easy to crack. Moreover, micro-segregation occurs at grain boundaries and in grains. The strength of the particles is therefore small. The particles tend to be further pulverized by thermal shock, vibration, cooling gas flows and so on during refrigerator operation, and their effect is considerably disadvantageous. The cold accumulating material thereby reduced in size may clog in the cold accumulating unit and increase the resistance to the passage of He gas, which is the operating fluid. On the other hand, it may enter the compressor with the He gas to produce wear on the parts thereof.

Also, particles formed by this method are not uniform in shape and the particle size ranges very widely. Many of them have a large aspect ratio (ratio of major diameter to minor diameter), and the proportion of particles having a small size is particularly large. Actually, for cold accumlating particles packed into the cold accumulating unit, an additional classification step for removing excessively fine particles is required, which presents a problem in terms of economy. That is, the yield of the cold accumulating material relative to the raw material is very small, about 30%, and the efficiency at which expensive rare earth elements are utilized is small. Moreover, since the shape of the particles is not uniform, the density at which the cold accumulating material is packed in the cold accumulating unit is restricted and the cold storing efficiency is low.

According to the conventional plasma spray method, a cold accumulating material is formed from a raw material prepared by roughly pulverizing a cast alloy of a rare earth element and a metal by mechanical pulverization based on, for example, the stamping method into particles having a comparatively large size. There is therefore much segregation due to non-uniformity of the amount of melt inside and outside each particle, and the dispersion of the particle structure or composition depending upon the cast structure is large.

Specifically, in the plasma spray method, it is difficult to control the processing temperature, and the plasma generation temperature is extremely high. There is a possibility of some raw material components being evaporated at the variable and high processing temperature to further increase the non-uniformity of the structure. Accordingly, the possibility of formation of local electric cells in each particle is strong. Particle portions containing electric cells tend to oxidize and corrode faster. Thus, particles formed by this method are inferior in chemical stability.

The surfaces of cold accumulating material particles prepared by the plasma spray method are considerably rough and many irregularities and small cracks from which breaking of the particles may be started during use are formed in the surfaces, as shown in FIGS. 10A and 10B. It is considered that such irregularities and cracks reduce the mechanical strength and promote the reduction in the particle size.

SUMMARY OF THE INVENTION

The present invention has been achieved to solve these problems and an object of the present invention is to provide a cold accumulating material improved in mechanical strength and in chemical stability, free from the risk of making the passage of the refrigerant difficult by being reduced in size during use, and capable of being produced from a raw material at a high yield in an economical way.

In view of the above-described circumstances, the inventors of the present invention has repeatedly experimented and studied many factors of a deterioration in the performance of a refrigerator and of pulverization of the cold accumulating material, for example, the kinds of raw materials, the average size of cold accumulating material particles, and ratio of the major diameter to the minor diameter (aspect ratio) and so on, and has obtained an extremely low temperature cold accumulating material superior than the conventional material in mechanical strength and chemical stability by quenching and solidifying a molten metal of a raw material mainly constituted by rare earth elements and by setting the average particle size of particles thereby formed and the ratio of the major diameter to the minor diameter of the particles to suitable ranges. To improve the cold accumulating material in cold accumlating efficiency, it is necessary to maximize the density at which the cold accumulating material is packed without increasing the resistance to the passage of the refrigerant flowing through the cold accumulating unit. The inventors of the present invention has found that for this purpose it is necessary to improve the roundness of each cold accumulating material particle to maximize the packing density and also necessary to minimize the surface roughness of the particles to reduce the area of contact between the particles. The present invention has been achieved based on these findings.

According to the present invention, there is provided a cold accumulating material comprising particles containing at least one kind of rare earth element selected from a group consisting of Y, La, Ce, Pr, Nd, Pm, Sm, Eu, Gd, Tb, Dy, Ho, Er, Tm, and Yb, the proportion of particles having a particle size of 0.05 to 3.0 mm being 70% or greater by weight, the proportion of particles having a shape such that the ratio of the major diameter to the minor diameter is not greater than 5 being 70% or greater by weight. Particularly, the surface roughness of the particles is preferable to be set to 10 $\mu m$ or less in terms of maximum height $R_{max}$. $R_{max}$ is defined in the Japanese industrial standard for the designation of surface roughness (standard JIS B 0601-1982) as follows: The maximum height, when a sampled portion has been interposed between the two parallel straight lines with a mean line of which length corresponds to the reference length that has been sampled from the profile, hereinafter, referred to as the "sampled portion", shall be the value, expressed in micrometer ($\mu m$) measuring the spacing of these two straight lines in the direction of vertical magnification of the profile. The profile is defined as the contour which appears on a cut end of a surface to be measured when the surface to be measured has been cut by a plane that is perpendicular to that surface. The reference length of the profile is defined as the length of the sampled portion of the surface. The mean line is defined as a straight or curved line which minimizes the deviation between that line and the actual positions of the surface along the reference length. The Japanese Industrial Standard JIS B 0601 provides a more detailed explanation of how to determine maximum height $R_{max}$ along with examples.

There is also provided a method of manufacturing a cold accumulating material, comprising using magnetic particles manufactured by quenching and solidifying a molten metal containing at least one kind of rare earth element selected from a group consisting of Y, La, Ce, Pr, Nd, Pm, Sm, Eu, Gd, Tb, Dy, Ho, Er, Tm, and Yb.

More specifically, there is provided a method comprising: preparing a molten metal containing at least one kind of rare earth element selected from a group consisting of Y, La, Ce, Pr, Nd, Pm, Sm, Eu, Gd, Tb, Dy, Ho, Er, Tm, and Yb; supplying the molten metal to a traveling surface of a high-speed rotary body disposed in a vacuum or cooling gas atmosphere; and finely dispersing the molten metal by the kinetic force of the rotary body while rapidly solidifying the molten metal to form spherical magnetic particles.

In another possible method, the molten metal having the above composition is prepared and made to flow out of an outlet disposed in a vacuum or cooling gas atmosphere, and a non-oxidizing atomizing gas is applied to the molten metal flowing out so that the molten metal is atomized and dispersed while being quenched to be solidified, thereby forming spherical magnetic particles.

The above and other objects, features and advantages of the present invention will be made more apparent by the following description with reference to the accompanying drawings.

BRIEF DESCRIPTION OF THE DRAWINGS

FIGS. 10A and 10B are electron microscope photographs of the structure of magnetic particles prepared by the plasma spray method.

DESCRIPTION OF THE PREFERRED EMBODIMENTS

Rare earth elements (including yttrium (Y)) constituting an extremely low temperature cold accumulating material in accordance with the present invention are specifically indispensable for forming magnetic particles having a large volumetric specific heat in an extremely low temperature range below 10 K. One or two kinds of rare earth element are selected to form a cold accumulating material according to the temperature range in which the volumetric specific heat peaks. A rare earth element (A) combines with a metal (M) such as nickel, cobalt, or copper to form a magnetic compound $(A.M_z)$. A compound of a rare earth element erbium (Er) and nickel (Ni) has a particularly high density and has a volumetric specific heat greater than that of a compound constituted by Pb in an extremely low temperature range below 15 K.

Aforesaid rare earth elements (A) may be added to the metal (M) in the form of a simple substance, but also may be added in the form of compound such as, boronite, sulfide, oxide, carbide and nitride of the rare earth elements. Even in the case of adding such a compound, same effects will be obtained.

Figure 1A:
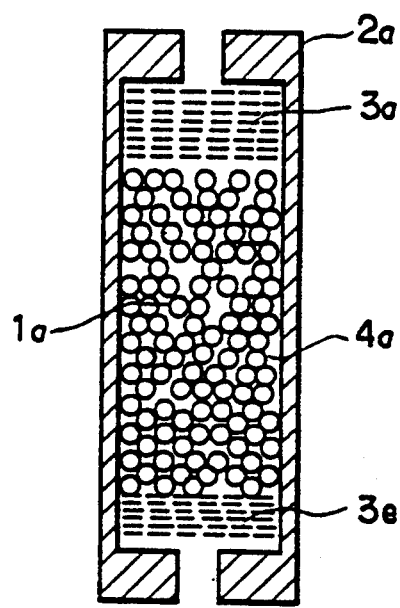
FIGS. 1A and 1B are an axial-sectional views of the packed structure of cold accumulating materials according to this invention.
Figure 1B:
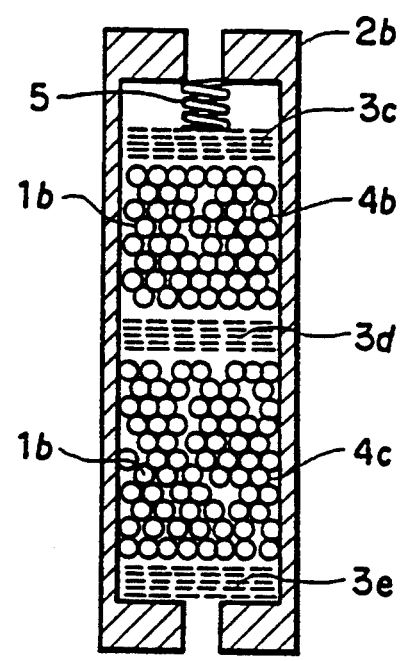

In accordance with the present invention, in magnetic particles formed as a cold accumulating material, the proportion of particles having a size of 0.01 to 3 mm to the whole of the magnetic particles is set to 70% and more by weight. As shown in FIG. 1A, cold accumulating material 1a is, for example, packed in one packing layer 4a formed between mesh-like members 3a, 3b which are disposed respectively at inner end portions of a cold accumulating unit 2a, or as shown in FIG. 1B, cold accumulating material 1b is packed in plurality of packing layers 4b, 4c formed between three mesh-like members 3c, 3d and 3e which are disposed with space in the cold accumulating unit 2b.

Accordingly, "cold accumulating material comprising particles" described in this specification implies a group of particles which should be independently packed into each of the aforesaid packing layers 4a to 4c of the cold accumulating units 2a and 2b of the refrigerator. Hence, parts for supporting cold accumulating materials 1a and 1b such as mesh-like members 3a to 3e and a spring member 5 for supressing the meshlike member are not contained in the word of cold accumulating material.

The size of the magnetic particles is a factor having a large influence upon the strength of the particles, the cooling functions and the heat transfer characteristics of the refrigerator. If the particle size is smaller than 0.01 mm, the density at which the cold accumulating material is packed in the cold accumulating unit is so high that the resistance to the passage of He gas provided as a refrigerant is abruptly increased and that the cold accumulating material enters the compressor with the flowing He gas and produces wear on the parts thereof to reduce the life of the same.

If the particle size is greater than 3 mm, there is a possibility of occurrence of segregation in the crystalline structure of the particles which renders the particles brittle and, hence, a considerable reduction in the effect of heat transfer between the magnetic particles and the refrigerant, i.e., the He gas. Accordingly, the average particle size is set to a range of 0.01 to 3 mm or, more preferably, to a range of 0.1 to 2 mm. To attain practically sufficient cooling functions and strength of the cold accumulating material, the proportion of particles having this size must be set to at least 70%. Preferably, it is set to 80% or greater, more preferably, 90% or greater.

The ratio of the major diameter to the minor diameter (aspect ratio) of the magnetic particles in accordance with the present invention is not greater than 5, preferably, not greater than 2 or, more preferably, not greater than 1.3. The setting of the aspect ratio of the magnetic particles greatly influences the strength of the particles and the density at which the particles are packed in the cold accumulating unit. If the aspect ratio is greater than 5, the particles tends to break by mechanical actions and cannot be packed at a high density, resulting in a reduction in the cold accumlating efficiency.

If magnetic particles are formed by a molten metal quenching method, the dispersion of the particle size and the dispersion of the ratio of the major diameter to the minor diameter are remarkably reduced in comparison with the conventional plasma spray method. The proportion of magnetic particles out of the above range is thereby reduced. Even though the dispersions of the particle size and the major-minor diameter ratio are substantially large, it is easy to classify the particles for the desired use. In this case, the proportion of particles having sizes within the above range to the whole of the magnetic particles packed in the cold accumulating unit is set to 70% or greater, preferably, 80% or greater or, more preferably, 90% or greater to obtain a cold accumlating material having a durability sufficient for practical use. It is possible to form, based on the molten metal quenching method, magnetic particles having extremely large strength and long life by setting the average crystal grain size of magnetic particles to 0.5 mm or smaller or by making at least part of the alloy structure amorphous.

That is, as a grain boundary is not formed in a amorphous body, the amorphous body has excellent mechanical characteristics in such as corrosion resistance, strength or the like. When the amorphous body is used in a cold accumulating material, the material will be free from cracks and further pulverization, thus being more reliable.

Also, as interatomic distances are distributed at random in the amorphous body, the distribution of interaction systems having an important effect upon a specific heat characteristic becomes broader, whereby excellent heat characteristics are obtained in the extremely low temperature range.

Moreover, as a distribution of the composition in a amorphous body can be controlled continuously, a desired characteristic corresponding to a optional composition can be obtained freely.

The surface roughness of the magnetic particles is a factor having a large influence upon the mechanical strength, cooling characteristics, the resistance to passage of the refrigerant, the cold accumlating efficiency and so on. This factor is determined by setting the maximum height $R_{max}$ of irregularities in accordance with JIS (Japanese Industrial Standard) B 0601 to 10 $\mu$m or less, preferably, 5 $\mu$m or less or, more preferably, 2 $\mu$m or less. These surface roughness are measured, for example, by a scanning tunnel microscope (STM roughness meter). If the surface roughness exceeds 10 $\mu$m $R_{max}$, the possibility of formation of microcracks from which breaking of the particles is started is increased and the resistance to passage of the refrigerant becomes larger to increase the compressor load. In particular, the area of contact between the packed magnetic particles is increased and the rate of transfer of cold heat between the magnetic particles is thereby increased, resulting in a reduction in the cold accumlating efficiency.

In practice, the proportion of magnetic particles to the whole which particles have small defects having a length longer than 10 $\mu$m and which influence the mechanical strength of the magnetic particles is set to 30% or smaller, preferably, 20% or smaller or, more preferably, 10% or smaller.

It has been confirmed by experiment that if each of the amounts of impurities inevitably mixed in the raw material metal and the amounts of impurities, such as oxygen, nitrogen, aluminum, silicon and hydrogen, inevitably mixed in the molten metal from a crucible and so on during the manufacture process is set to 2,000 ppm or less, formation of oxidized films can be prevented and the reduction in the strength of the magnetic particles can be limited.

One important feature of the present invention resides in the magnetic particles used in accordance with the present invention are prepared by processing a molten metal containing predetermined rare earth elements based on a molten metal quenching method, e.g., the rotary disk process method, the single roll method, the double roll method, the inert Gas atomization method, or the rotary nozzle method.

Figure 2:
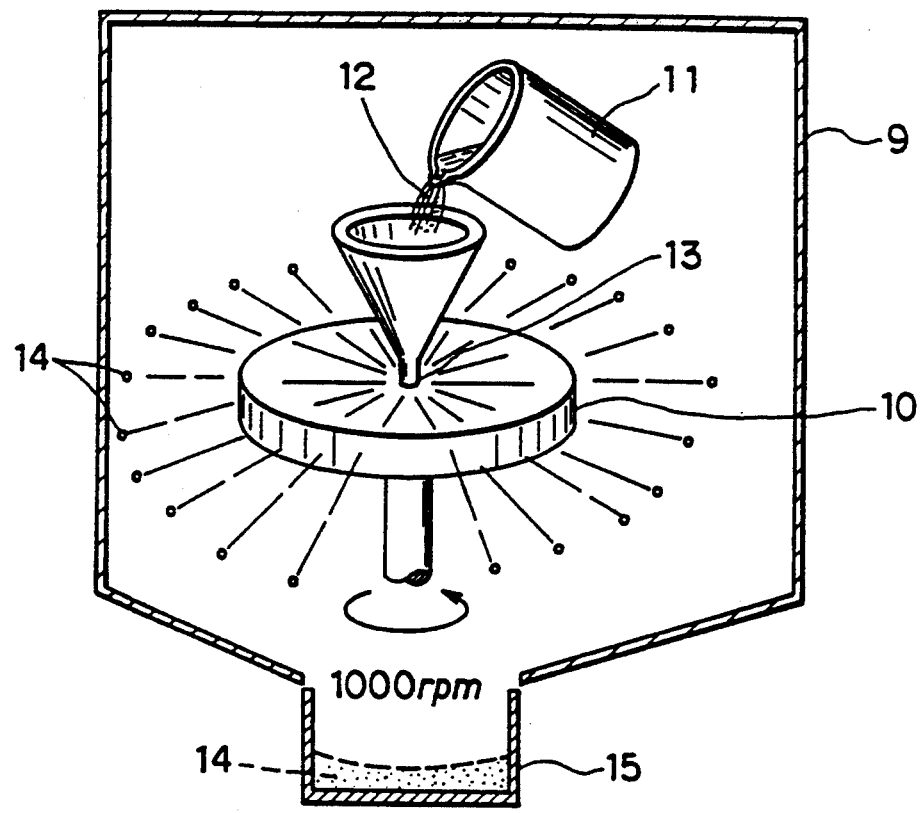
FIG. 2 is a perspective view of the construction of a particle manufacturing apparatus based on the rotary disk process (RDP) method.

FIG. 2 shows an example of a particle manufacturing apparatus based on the rotary disk process method (hereinafter referred to as "RDP method"). This apparatus has a disk-like rotary body 10 disposed in a cooling chamber 9 enclosing a helium gas atmosphere, and a pouring nozzle 13 which temporarily stores a molten metal 12 supplied from a ladle 11 and ejects the molten metal 12 onto a traveling surface of the disk-like rotary body 10. The disk-like rotary body 10 is formed of a ceramic or metallic material having a comparatively poor wetting property with respect to the molten metal to prevent the molten metal 12 from attaching to and solidifying on the rotary body 10.

The molten metal 12 ejected from the pouring nozzle 13 onto the traveling surface of the disk-like rotary body 10 is finely dispersed by the kinetic force of the disk-like rotary body 10, is formed into spherical shapes by the surface tension while flying in the cooling chamber 9, and is cooled by the atmosphere gas, e.g., helium gas to be solidified, thereby being formed as spherical magnetic particles 14. The magnetic particles 14 thereby formed area received by a particle collecting container 15 disposed at the bottom of the cooling chamber 9.

Figure 3:
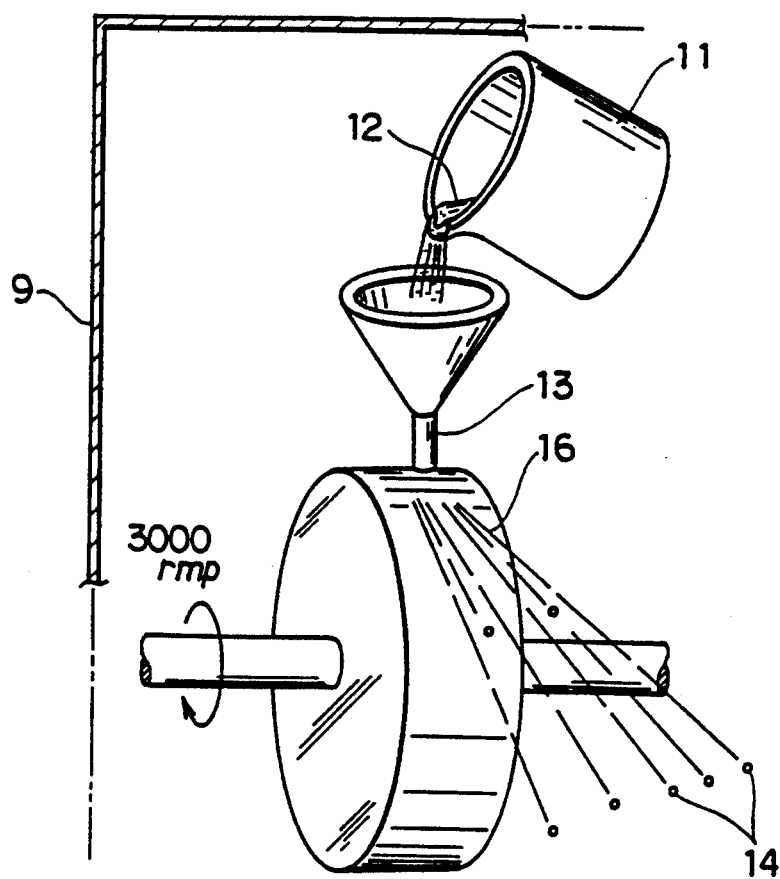
FIG. 3 is a perspective view of the construction of a particle manufacturing apparatus based on the single roll method.

FIG. 3 shows an example of a particle manufacturing apparatus based on the single roll method. This apparatus has a atomizing roll 16 having a diameter of about 300 mm and having its surface coated with a fused ceramic, and a pouring nozzle 13 which temporarily accumulates a molten metal 12 supplied from a ladle 11 and thereafter ejects the molten metal 12 onto a traveling surface of the roll 16. The atomizing roll 16 and other components are housed in a cooling chamber 9 in which an inert gas atmosphere is maintained as in the case of the apparatus shown in FIG. 2. The number of revolutions of the atomizing roll 16 is set to 3000 to 5000 rpm.

The molten metal 12 ejected from the pouring nozzle 13 is dispersed on the traveling surface of the roll 16, and is cooled and solidified while flying in the cooling chamber 9, thereby being formed as spherical magnetic particles 14.

Figure 4:
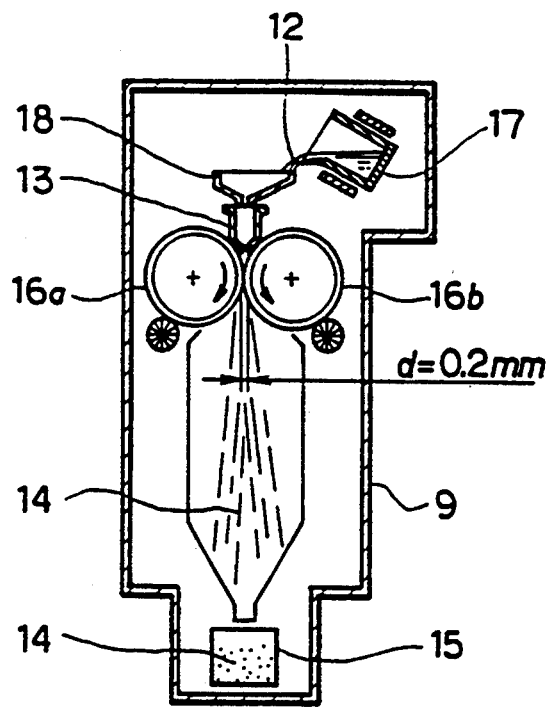
FIG. 4 is a sectional view of the construction of a particle manufacturing apparatus based on the double roll method.

FIG. 4 shows an example of a particle manufacturing apparatus based on the double roll method. This apparatus has at least one pair of atomizing rolls 16a and 16b disposed in a cooling chamber 9 so that their traveling surfaces face each other, a smelting furnace 17 for melting a raw material metal to prepare a molten metal 12, and a pouring nozzle 13 which is supplied with the molten metal 12 through a tundish 18 and which ejects the molten metal 12 to a gap formed between the atomizing rolls 16a and 16b. Each of the atomizing rolls 16a and 16b facing each other has a diameter of about 50 mm and is formed of, for example, a metallic material. The surfaces of the atomizing rolls 16a and 16b are coated with a fused ceramic. The atomizing rolls 16a and 16b are capable of rotating at a high speed of about 5000 rpm while maintaining a small gap d of 0.05 to 0.5 mm between the traveling surfaces.

Shape rolls with traveling surfaces having a U- or V-shaped cross section may be adopted as atomizing rolls instead of those having traveling surfaces parallel to the axes of rotation as shown in FIG. 4.

If the gap d between the atomizing rolls 16a and 16b is excessively small, the shape of the magnetic particles becomes flake-like. Ordinarily, the gap d is set to about 0.2 mm.

The molten metal 12 ejected from the pouring nozzle 13 toward the gap between the atomizing rolls 16a and 16b is finely dispersed by these rolls while being formed into spherical shapes, is cooled and solidified by an atmosphere gas while flying downward, thereby being formed as spherical or flat elliptical magnetic particles 14 which are collected in a particle collecting container 15, as in the case of the apparatus shown in FIG. 2 or 3.

Figure 5:
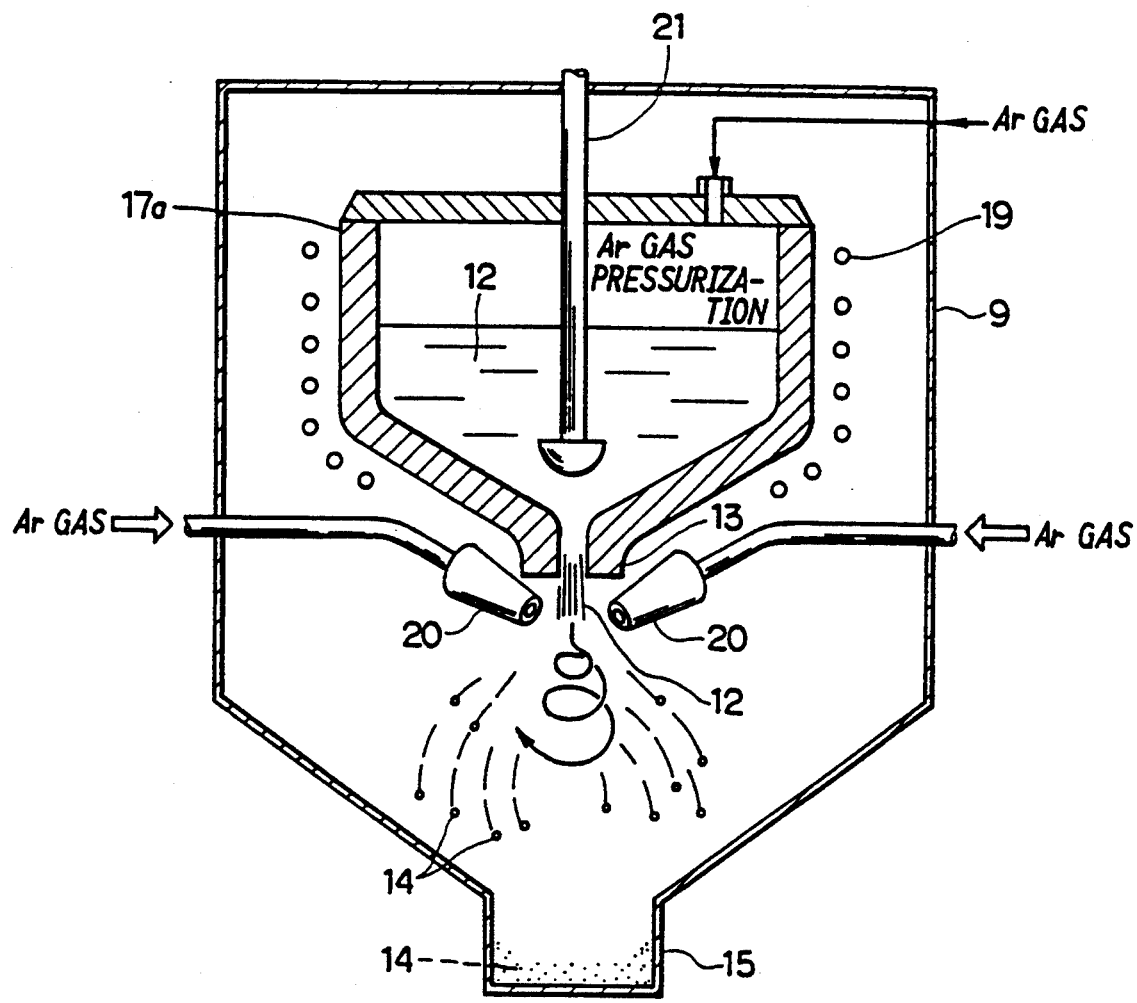
FIG. 5 is a sectional view of the construction of a particle manufacturing apparatus based on the inert gas atomization method.

FIG. 5 shows an example of a particle manufacturing apparatus based on the inert gas atomization method. This apparatus has a smelting furnace 17a in which a raw material metal is heated and molten with a heater 19 to prepare a molten metal 12, a pouring nozzle 13 formed at the bottom of the smelting furnace 17a and having an inside diameter of about 2 mm, a plurality of inert gas nozzles 20 having orifices facing a position immediately below the lower opening end of the pouring nozzle 13 and capable of jetting a cooling inert gas such as argon gas, and an opening/closing valve 21 for opening or closing the pouring nozzle 13.

The surface of the molten metal 12 prepared in the smelting furnace 17a is pressurized by the high pressure Ar gas supplied to the interior of the furnace to eject the molten metal 12 through the end opening of the pouring nozzle 13. At this time, the inert gas, e.g., Ar gas, is jetted at a high speed through the inert gas nozzles 20 disposed so as to face in directions perpendicular to the direction in which the molten metal 12 is ejected. The molten metal 12 is thereby atomized and dispersed by the inert gas and is cooled and solidified while flowing downward along whirling flows of the inert gas, thereby being formed as spherical, cocoon-like or flat elliptical magnetic particles 14 which are collected in a particle collecting container 15.

Figure 6:
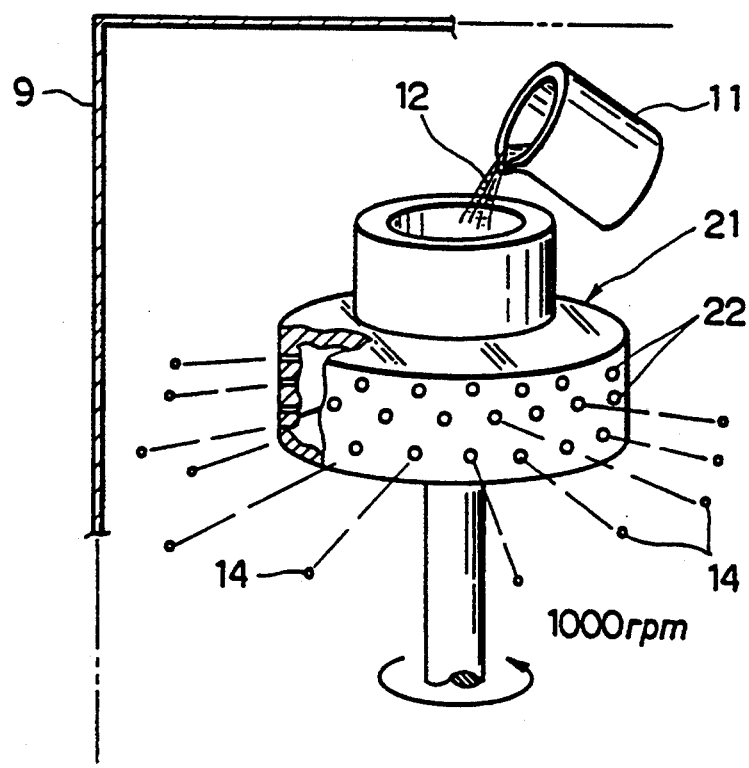
FIG. 6 is a perspective view of the construction of a particle manufacturing apparatus based on the rotary nozzle method.

It is also possible to manufacture the extremely low temperature cold accumulating material in accordance with the present invention by using the rotary nozzle method, i.e., a type of molten metal quenching method. FIG. 6 shows an example of a particle manufacturing apparatus based on the rotary nozzle method. This apparatus has a rotary nozzle 21 formed of graphite, having a cylindrical shape closed at its bottom and having a diameter of about 100 mm. A multiplicity of fine ejection holes 22 are formed in a side surface of the rotary nozzle 21 to radially eject the molten metal 12 supplied from a ladle 11. The rotary nozzle 21 is rotated at a high speed of about 1000 rpm. The inside diameter of each ejection hole 22 is set to about 0.5 mm.

The molten metal 12 supplied from the ladle 11 is poured into the rotary nozzle 21 rotating at the high speed, is ejected in radial directions through the ejection holes 22 by the centrifugal effect while being changed into fine molten metal particles, and is cooled and solidified by a cooling gas such as Ar gas while flying in a cooling chamber 9, thereby being formed as spherical or spheroidal magnetic particles 14.

If the refrigerator is operated by using magnetic particles newly formed by quenching and solidifying a molten metal and directly packed in the cold accumulating unit, there is a possibility of the point (operating point) at which the volumetric specific heat of the magnetic particles peaks is shifted at an initial operation stage, resulting in a reduction in the operation stability. It is considered that this phenomenon is owing to a transition state of the crystlline structure of the magnetic particles.

To cancel this unstable state, the conventional method requires a troublesome operation of increasing and reducing the temperature of the prepared magnetic particles several times by heating and cooling through a temperature range between room temperature and the liquid helium temperature.

However, an experiment relating to the present invention has revealed that the operating point can be stabilized by a stabilizing process based on heating at 200° to 800° C. for 1 to 2 hours before magnetic particles newly prepared are used as a cold accumulating material.

This stabilizing process enables the refrigerator in which a new cold accumulating material is packed to be operated with stability even at an initial operation stage, and makes it possible to immediately attain the desired performance of the refrigerator.

In accordance with the extremely low temperature cold accumulating material and the manufacturing method of the present invention, as described above, rare earth elements having a large volumetric specific heat in an extremely low temperature range are used and a molten metal containing such elements is rapidly solidified to form magnetic particles used as a cold accumulating material, thereby improving the cooling effect of the refrigerator in the extremely low temperature range.

In particular, since the magnetic particles are prepared by a molten metal quenching method, there is substantially no possibility of occurrence of segregation in each particle or non-uniformity of the structure thereof. The mechanical strength and the chemical characteristics of the magnetic particles are therefore improved remarkably as compared with magnetic particles prepared by the conventional plasma spray method. Accordingly, the magnetic particles of the present invention are free from the risk of being finely pulverized and, hence, the risk of a reduction in the refrigerator performance even when used as a cold accumulating material for a long time.

The magnetic particles of the present invention are generally spherical and the their surfaces are formed specularly and very smoothly. It is thereby possible to set a high density at which the magnetic particles are packed in the cold accumulating unit as well as to greatly reduce the resistance to passage of the refrigerant. Substantially no defects including small cracks which make the particles breakable are formed in the particle surfaces. The life of the cold accumulating material is therefore remarkably extended.

Moreover, the dispersion of the size of magnetic particles prepared by the molten metal quenching method and the dispersion of the ratio of the major diameter to the minor diameter thereof are extremely smaller than those attained by the conventional plasma spray method. Therefore, the need for classification is reduced and the yield of product particles relative to the raw material is increased to about 90 to 95%, thereby remarkably reducing the manufacture cost of the cold accumulating material.

EMBODIMENTS

Examples of the present invention will now be described below.

Examples 1, Reference Examples 1

Molten alloys defined by composition ratios $ErNi_{1/3}$, $ErNi$, $ErNi_2$, $PrB_6$, $Gd_{0.5}Er_{0.5}Rh$, $Er_{0.75}Dy_{0.25}Ni_2$, $Er_{0.5}Dy_{0.5}Ni_2$, $DyNi_2$ and $GdRh$ were processed by quenching solidification using a particle manufacturing apparatus based on the RDP method such as that shown in FIG. 2. As processing conditions, the outside diameter of the disk-like rotary body was set to 80 mm and the number of revolutions thereof was set to 10000 rpm. Magnetic particles having a particle size of 100 to 300 μm and having a major-minor diameter ratio of 1.00 to 1.02 were obtained at a rate of 90% or higher by weight of each molten alloy.

Figure 7:
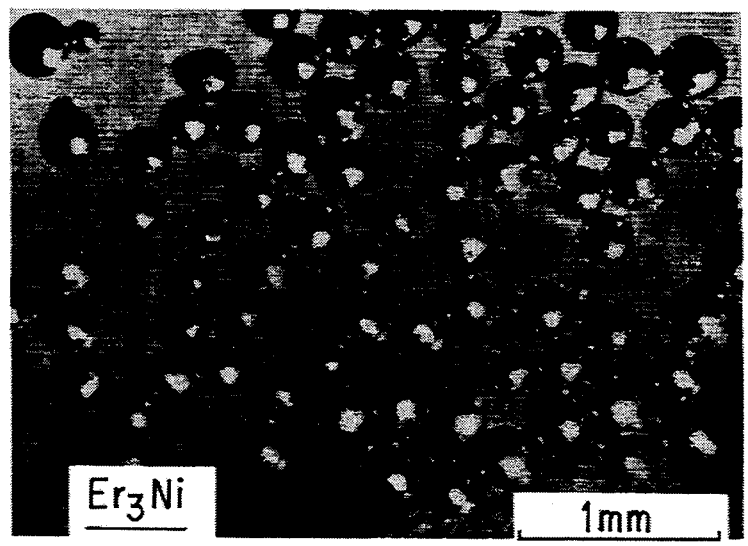
FIG. 7 is an electron microscope photograph of the structure of magnetic particles prepared by the rotary disk process method.

FIG. 7 shows the appearance of a typical example ErNi$_{1/3}$ (Er$_3$Ni) among the magnetic particles thereby formed. The magnetic particles of each composition ratio have generally spherical shapes and the surfaces thereof were specularly smooth, as shown in FIG. 7.

Figure 8A:
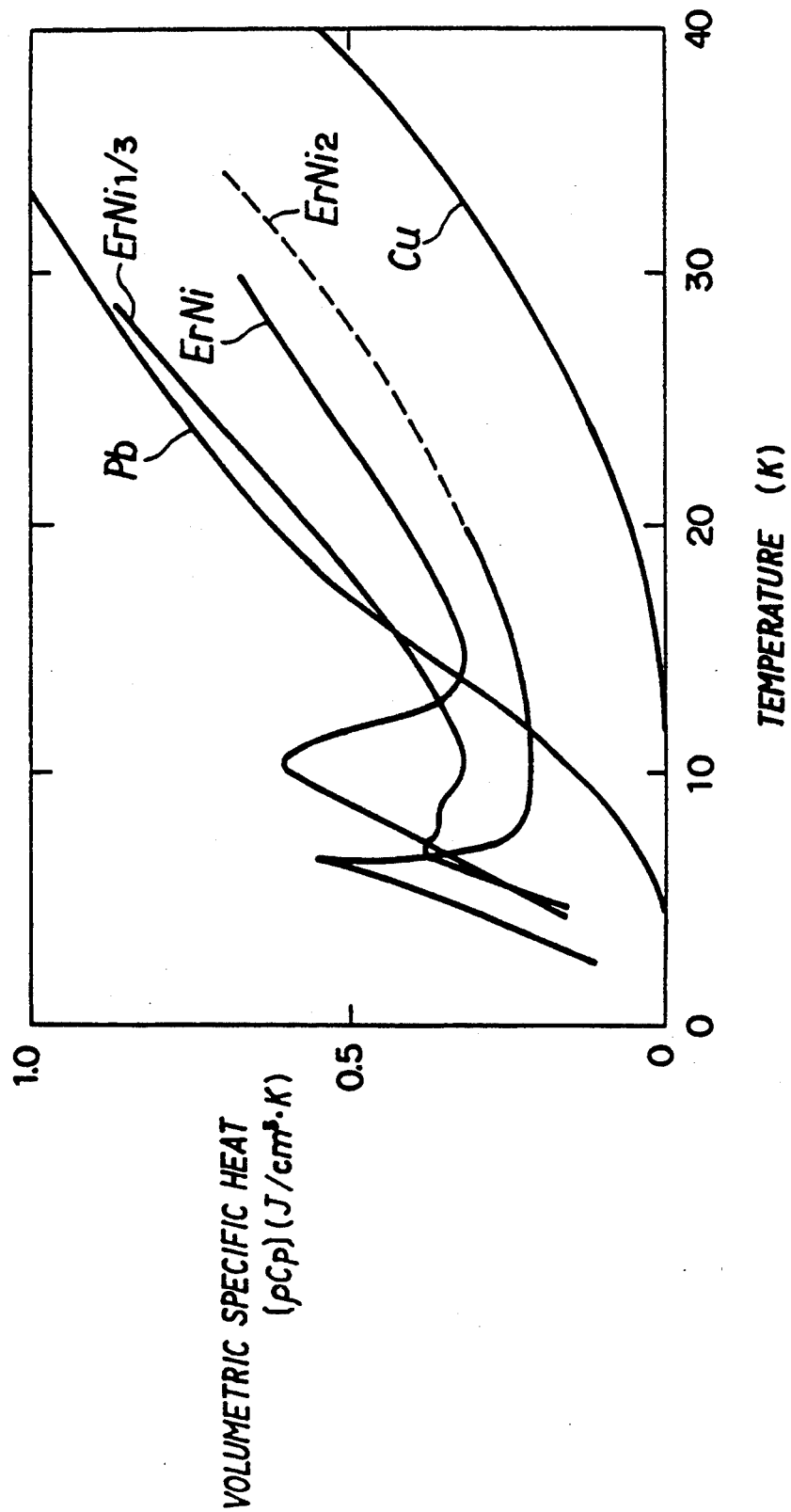
FIGS. 8A and 8B are graphs of characteristics of various types of cold accumulating materials represented by the volumetric specific heat with respect to temperatures.
Figure 8B:
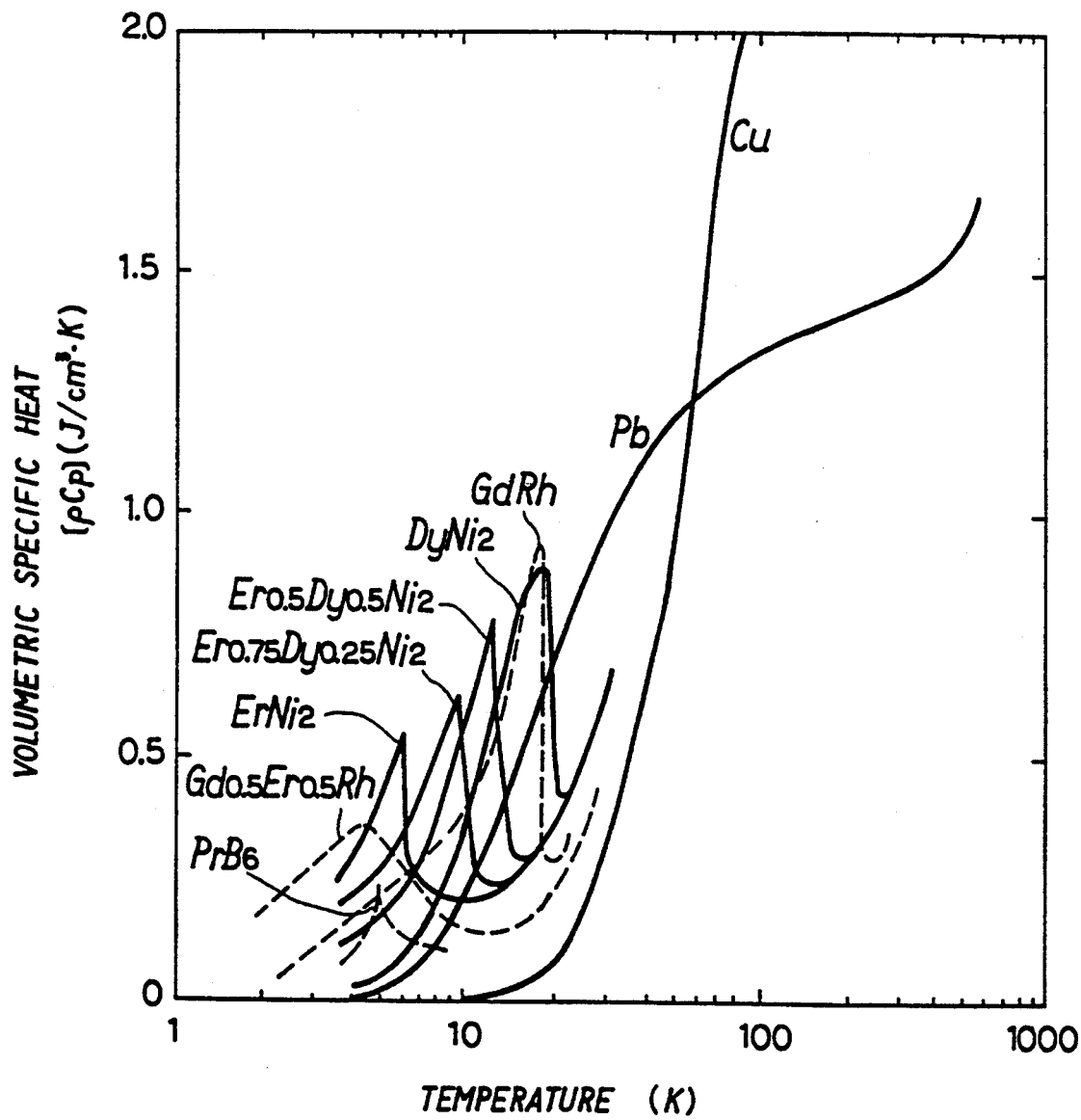
Figure 9:
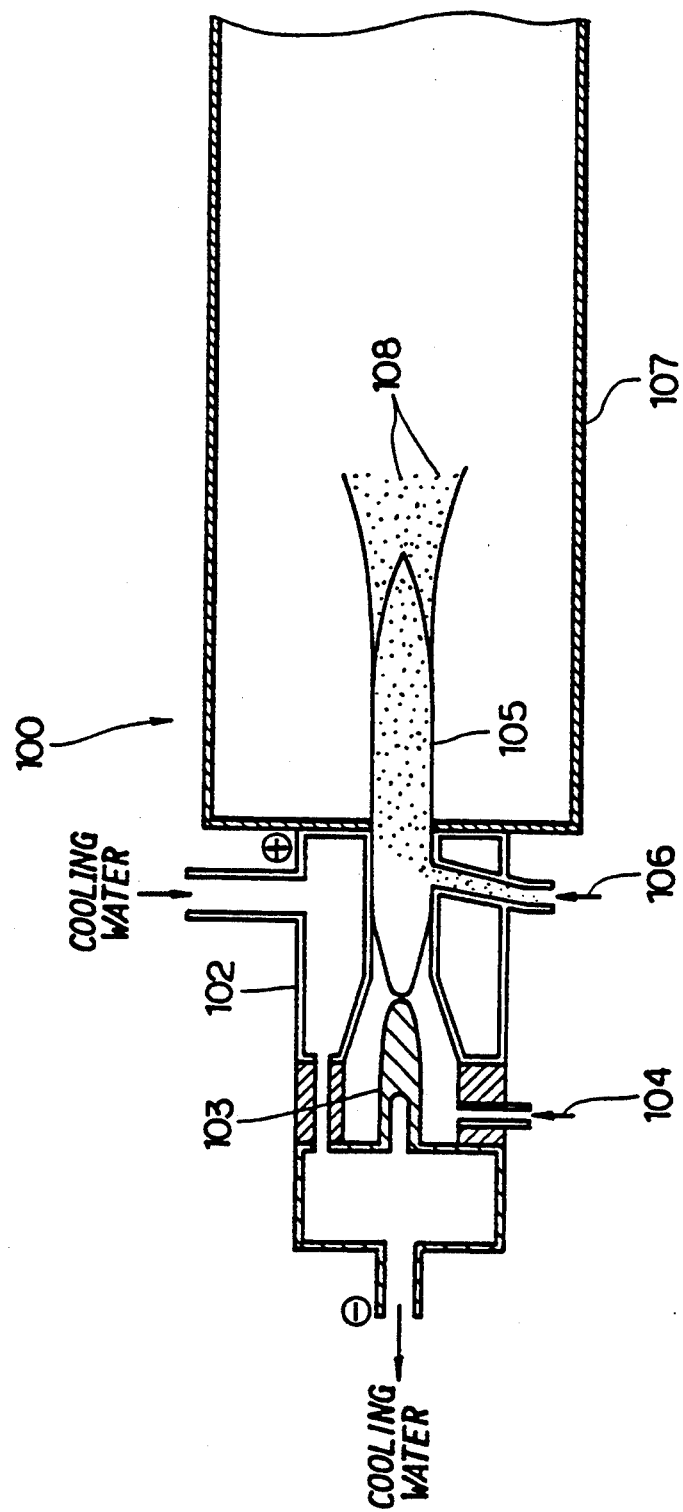
FIG. 9 is a sectional view of a plasma spray gun apparatus.

The volumetric specific heats of the obtained magnetic particles were measured. The characteristic values shown in FIGS. 8A and 8B were thereby obtained. The volumetric specific heat of the rare earth containing materials has a local miniumum below 25° C. in all cases and below 20° C. for most of the compounds shown. The volumetric specific heat of the rare earth containing compounds shown in FIGS. 8A and 8B increase below 20° C. to values that are much higher than the volumetric specific heat of copper or lead at comparable temperatures.

The magnetic particles in accordance with each example were packed in a cold accumulating unit of a refrigerator at a packing rate of 69% close to the maximum packing rate, and the resistance to the passage of helium gas flowing through the cold accumulating unit was measured after cycles of a GM refrigeration operation continuously performed for 500 hours by supplying a helium gas having a heat capacity of 25 J/K at a mass flow rate of 3 g/sec and at a gas pressure of 16 atm. As a result, the rate at which the passage resistance was increased from the start of the operation was not higher than 1% with respect to each example.

Magnetic particles prepared by the conventional plasma spray method as Reference Examples 1 were packed as a cold accumulating material and the refrigerator was operated under the same conditions for 500 hours. In this case, the increase in the He gas passage resistance was 40 to 50%.

After the operation for 500 hours, particles in accordance with each of the examples of the present invention and the reference examples were taken out of the cold accumulating unit to be examined. No pulverized state was observed with respect to the examples of the present invention. In the case of the reference examples, the proportion of finely pulverized particles was about 10 to 20%.

It was also confirmed that the refrigerant passage resistance immediately after the start of the operation in the case of each example of the present invention was smaller by about 10% in comparison with Reference Examples 1, and that the pressure loss in the system was thereby reduced.

Examples 2

Molten alloys defined by the same composition ratios as Examples 1 were processed by quenching solidification using a particle manufacturing apparatus based on the single roll method such as that shown in FIG. 3. As processing conditions, the outside diameter of the pulverizing roll was set to 300 mm and the number of revolutions thereof was set to 3000 rpm. Magnetic particles having a particle size of 100 to 300 μm and having a major-minor diameter ratio (aspect ratio) of 1.05 to 1.3 were thereby obtained at a yield of 80% or higher.

Most of the obtained magnetic particles were generally spherical and some of them were elliptical. However, the surface of each particle was formed specularly and smoothly.

The magnetic particles in accordance with each of Examples 2 were packed in the cold accumulating unit of the GM refrigerator at the same density as Examples 1, and the refrigerator was operated in the same manner. The refrigerant passage resistance immediately after the start of the operation was reduced by 7 to 8% in comparison with Reference Examples 1. The passage resistance was also measured after 500 hour operation performed under the same conditions as Examples 1. As a result, no increase in the passage resistance was recognized and no progress in pulverization of the magnetic particles was observed.

Examples 3

Molten alloys defined by the same composition ratios as Examples 1 were processed by quenching solidification using a particle manufacturing apparatus based on the double roll method such as that shown in FIG. 4. As processing conditions, the diameter of the pulverizing rolls was set to 50 mm, the number of revolutions thereof was set to 5000 rpm, and the gap d was set to 0.2 mm. Magnetic particles having a particle size of 100 to 300 μm and having a major-minor diameter ratio of 1.02 to 2.5 were thereby obtained at a yield of 80% or higher.

Most of the obtained magnetic particles were generally spherical and some of them were elliptical. However, the surface of each particle was formed specularly and smoothly.

The magnetic particles in accordance with each of Examples 3 were packed in the cold accumulating unit of the GM refrigerator at the same density as Examples 1, and the refrigerator was operated in the same manner. The refrigerant passage resistance immediately after the start of the operation was reduced by 6% in comparison with Reference Examples 1. The passage resistance was also measured after 500 hour operation performed under the same conditions as Examples 1. As a result, no increase in the passage resistance was recognized and no progress in pulverization of the magnetic particles was observed.

Examples 4

Molten alloys defined by the same composition ratios as Examples 1 were processed by quenching solidification using a particle manufacturing apparatus based on the inert gas atomization method such as that shown in FIG. 5. The processing conditions were set as follows: the inside diameter of the pouring nozzle was 2 mm, two inert gas nozzles having an inside diameter of 1 mm were provided, and the pressure of argon gas provided as an inert gas jetted through the nozzles was set 4 kg/cm$^2$. Magnetic particles having a particle size of 100 to 300 μm and having a major-minor diameter ratio of 1.0 to 4 were thereby obtained at a yield of 70% or higher.

Most of the obtained magnetic particles were generally spherical and some of them had elliptical, flat or asteroid shapes. However, the surface of each particle was formed specularly and smoothly.

The magnetic particles in accordance with each of Examples 4 were packed in the cold accumulating unit of the GM refrigerator at the same density as Examples 1, and the refrigerator was operated in the same manner. The refrigerant passage resistance immediately after the start of the operation was reduced by 2 to 3% in comparison with Reference Examples 1. The passage resistance was also measured after 500 hour operation performed under the same conditions as Examples 1. As a result, no increase in the passage resistance was recognized and no progress in pulverization of the magnetic particles was observed.

Examples 5

Molten alloys defined by the same composition ratios as Examples 1 were processed by quenching solidification using a particle manufacturing apparatus based on the rotary nozzle method such as that shown in FIG. 6. The processing conditions were set as follows: the inside diameter of the rotary nozzle was 100 mm, the number of revolutions thereof was 1000 rpm, and the inside diameter of the ejection holes was 0.5 mm. Magnetic particles having a particle size of 100 to 300 μm and having a major-minor diameter ratio of 1.05 to 1.1 were thereby obtained at a yield of 90% or higher.

Most of the obtained magnetic particles were generally spherical and some of them were elliptical. However, the surface of each particle was formed specularly and smoothly.

The magnetic particles in accordance with each of Examples 5 were packed in the cold accumulating unit of the GM refrigerator at the same density as Examples 1, and the refrigerator was operated in the same manner. The refrigerant passage resistance immediately after the start of the operation was reduced by 10% in comparison with Reference Examples 1. The passage resistance was also measured after 500 hour operation performed under the same conditions as Examples 1. As a result, no increase in the passage resistance was recognized and no progress in pulverization of the magnetic particles was observed.

Examples 6, Reference Examples 2

Examples 6 were prepared by heating the magnetic particles in accordance with Examples 1 to 5 at 300° C. for 2 hours for stabilization, while Reference Examples 2 were prepared by using the same magnetic particles without stabilizing these particles. Each example was packed in the cold accumulating unit of the GM refrigerator at the same density and the refrigerator was operated, thereby comparing the starting characteristics.

As a result, in the case of the former, the operating point was stabilized in about one hour after the start of the operation. In the case of the latter, the operating point was changed with respect to time and the time taken to attain the predetermined cooling effect was 5 hours.

For the above-described examples, rare earth elements having large volumetric specific heats in an extremely low temperature range and capable of attaining superior cold accumulating effects were used. However, the method of manufacturing the extremely low temperature cold accumulating material in accordance with the present invention can be applied to the manufacture of magnetic particles containing some of gadolinium-rhodium (Gd.RH), Gadolinium.Erbium.-Rhodium (Gd.Er.Rh), various transition elements and rare earth elements apart from the above-metioned magnetic particle raw materials.

Examples 7-10, Reference Examples 3-7

Molten alloy having a composition $Er_3Ni$ was processed by quenching solidification using a particle manufacturing apparatus based on the RDP method such as that shown in FIG. 2, whereby magnetic particles having a surface roughness of 1 μm, an average crystal grain size of 5 μm and amorphousizing ratio of 0% were obtained as shown in the left column of Table 1. Then, the magnetic particles were classified into several particle groups so that each of the proportions of the magnetic particle groups having a particle size of 0.1 to 2 mm were 60, 75, 80% by weight, and/or classified into several particle groups so that the proportions of the magnetic particle groups having aspect ratios of 1.3 or less were 60, 75, 80% by weight, respectively.

Then, cold accumulating materials with respect to the Examples 7-10 and the Reference Examples 3-7 were prepared by using each of the particle groups.

The cold accumulating materials 1c . . . in accordance with each example were packed in a GM refrigerator for the purpose of testing, and the refrigeration capacity of each materials was measured.

Figure 11:
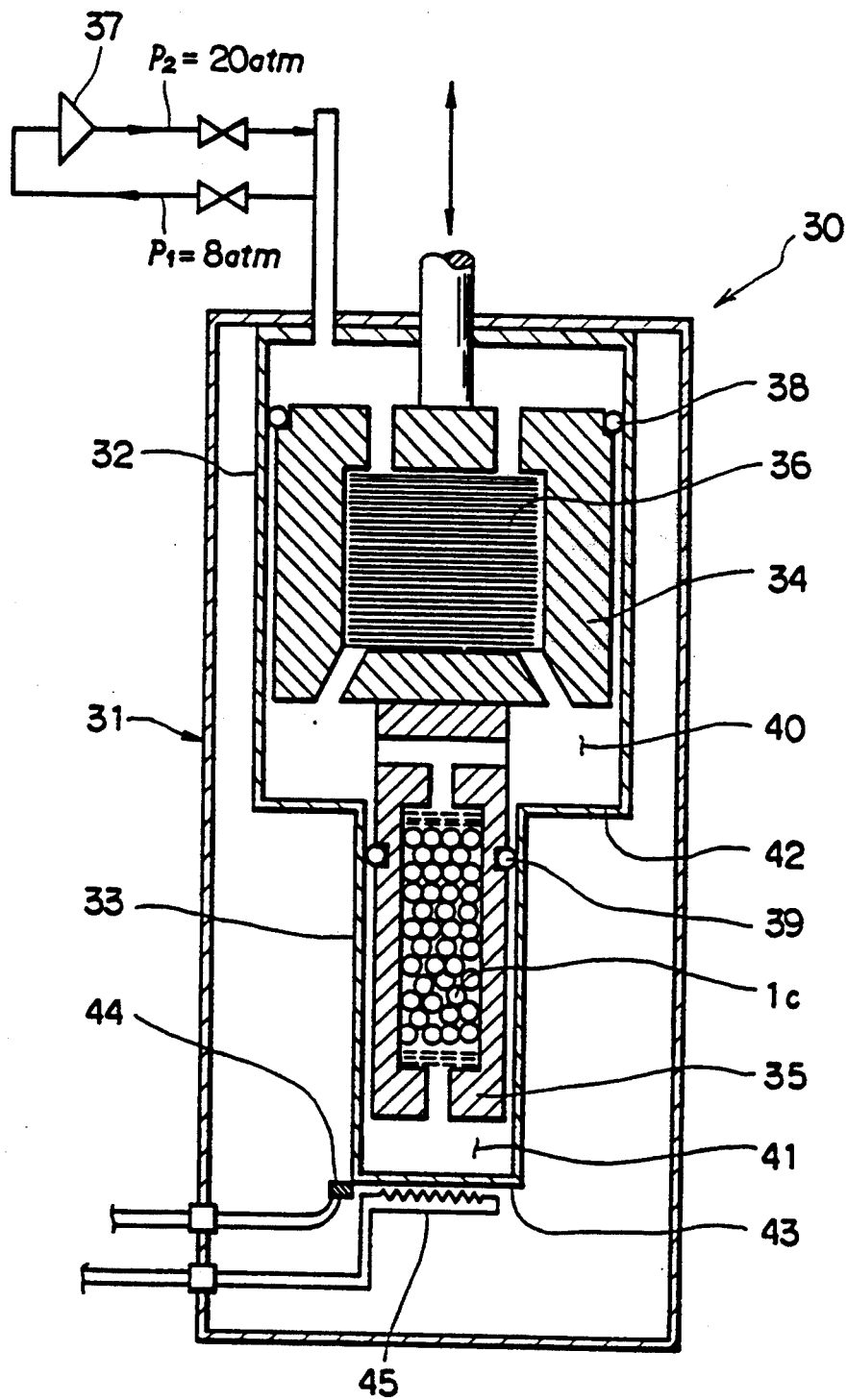
FIG. 11 is an axial-sectional view of the construction of the GM refrigerator prepared for measuring refrigeration capacities of the cold accumulating materials prepared in each of the embodiments.

By the way, the GM refrigerator applied for testing the refrigeration capacity comprises, as shown in FIG. 11, outer shells 32 and 33 disposed directly in a vacuum vessel 31, a first cold accumulating unit 34 and a second cold accumulating unit 35 which are slidably arranged in the outer shell 32 and 33, respectively, Cu mesh-like member 36 packed in the first cold accumulating unit 34 as a first cold accumulating material, a second cold accumulating material 1c . . . of each example packed in the second cold accumulating unit 35, and a compressor for supplying He gas to the outer shell 32.

A seal-ring 38 is disposed between the outer shell 32 and the first cold accumulating unit 34, while a seal-ring 39 is disposed between the outer shell 33 and the second accumlating unit 35. A first expansion chamber 40 is formed between the outer shell 32 and the first cold accumulation unit 34, while a second expansion chamber 41 is formed between the outer shell 33 and the second cold accumulating unit 35. A first cooling stage 42 and a second cooling stage 43 are formed at the bottom portions of the first and second expansion chambers 40 and 41, respectively.

Moreover, in order to measure characteristics of the cold accumulating material with each example, a resistive thermometer (carbon black resistor) 44 for measuring a temperature of the second cooling stage 43 and a heater 45 for supplying thermal load to the second cooling stage 43 are provided on the second cooling stage 43.

In the case of measuring a refrigeration capacity of the cold accumulating materials 1c . . . , the Cu mesh-like member 36 was packed in the first cold accumulation unit 34 while each of the sample of cold accumulating materials 1c . . . was packed in the second cold accumulating unit 35. The GM refrigerator 30 was operated at about 60 cycles per minute. The compressed He gas by the compressor 37 at the pressure of 20 atms took place repeatedly adiabatic expansion at the first and second expansion chamber 40 and 41 to generate cold. Generated cold was accumulated in the Cu mesh-like member 36 and cold accumulating materials 1c.

In the embodiments according to this invention, refrigeration capacity was measured by loading a thermal load to the second cooling stage 43, and the refrigeration capacity was defined as a thermal load at the time when a temperature rise of the second cooling stage 43 stopped at 6 degree (K). That is, a thermal load at 6 K. was measured as a refrigeration capacity.

Then refrigeration capacities of each of the cold accumulating materials with respect to the Examples 7-10 and Reference Examples 3-7 were measured in such a manner described above, and results are shown in right column of the Table 1.

As is clear from the results shown in Table 1, cold accumulating materials with respect to the Examples 7-10 of which the proportion of the particles having a particle size of 0.1 to 2 mm is 70 wt % and more, and the proportion of the particles having an aspect ratio of 1.3 or less is 70 wt % and more, have an excellence in refrigeration capacity. While the refrigeration capacities of the cold accumulating materials with respect to the Reference Examples 3-7 which was lacking in either of the conditions described above, are decreased.

Examples 11-17, Reference Examples 8-9

The magnetic particles having a composition of $Er_3Ni$ prepared in the Examples 7-10 were divided into two particle groups so that the proportions of the particles having a particle size of 0.1 to 2 mm and of 0.01-3 mm were 80 wt % and more, respectively. Aspect ratios and proportions of each of the particle groups were controlled respectively to values shown in left column of the Table 1. The cold accumulating material with respect to Examples 11-17 and Reference Examples 8-9 were prepared by using each of the particle groups.

The cold accumulating materials were packed in the GM refrigerator 30 shown in FIG. 11 and the refrigeration capacities thereof were measured in the same manner as Examples 7. The results are shown in right column of Table 1.

As is apparent from Table 1, cold accumulating material with respect to Examples 11-17 which are composed of particles having a small aspect ratio and a high sphericity have excellent refrigerating capacities in comparison with Reference Examples 8-9.

Examples 18-19, Reference Example 10

Molten alloy having a composition $Er_3Ni$ was processed by quenching solidification utilizing the RDP method, whereby magnetic particles having a surface roughness of 3 $\mu$m ($R_{max}$), an average crystal grain size of 5 $\mu$m, an amorphousizing ratio of 0%, a proportion of the particles having a particle size of 0.1-2 mm was 80 wt % and a proportion of the particles having a aspect ratio of 1.3 or less was 80 wt % were obtained. Then cold accumulating material was prepared by using aforementioned particles as Example 18.

Next, the particles prepared in the Example 18 were subjected to etching treatment so that the surface roughness thereof was controlled to 8 $\mu$m and 15 $\mu$m, respectively. The cold accumulating materials were prepared as Example 19 and Reference Example 10 by using the respective particles having different surface roughness.

Then, the refrigerating capacity of each of cold accumulating materials was measured in the same manner as in Example 7 and results are shown in right column of Table 1.

In this time, surface roughness was measured by using a scanning tunnel microscope (STM roughness meter), and values of roughness were expressed as a maximum height $R_{max}$ of irregularities in accordance with JIS (Japanese Industrial Standard) B 0601.

As is clear from Table 1, refrigerating capacity of a cold accumulating material is more improved as the surface roughness thereof becomes smaller.

Examples 20-23, Reference Example 11

Molten alloy having a composition $Er_3Ni$ was processed by quenching solidification using a particle manufacturing apparatus based on the RDP method. The processes were carried out using He gas, high pressurized Ar gas and low pressurized Ar gas as cooling gasses, respectively. Three kinds of magnetic particles having an average crystal grain size of 5, 50 and 200 $\mu$m were obtained, respectively. Then, each kind of the particles was controlled so that proportion of the particles having a particle size of 1-1.2 mm was 80 wt % and proportion of the particles having an aspect ratio of 1.3 or less was 80 wt %. The cold accumulating materials were prepared as Examples 20-22 by using each kind of the particles.

On the other hand, particles were manufactured under vacuum condition by utilizing RDP method. The obtained particles have an average particle size of 500 $\mu$m. The distributions of particle size and aspect ratio of the particles were the same as those of Examples 20-22. Then, cold accumulating material was prepared as Example 23 by using the particles.

Furthermore, the cold accumulating material prepared in Example 23 was heat treated to produce particles having a large crystal grain size. The thus produced particles having an average crystal grain size of 600 $\mu$m were formed into a cold accumulating material of Reference Example 11.

Each of the cold accumulating materials in accordance with Examples 20-23 and Reference Example 11 was packed in the GM refrigerator 30, and refrigerating capacities were measured in the same manner as in Example 7. The results are shown in right column of Table 1.

As is apparent from Table 1, the refrigerating capacities of the cold accumulating materials in accordance with Examples 20-23 which are composed of the particles having an average crystal grain size of 0.5 mm or less are about three times greater than that of Reference Example 11 which is composed of particles having large crystal grain size.

Examples 24-28, Reference Example 12

Particles were manufactured by utilizing either RDP method or double role method. Then a part of the manufactured particles were subjected to etching treatment to increase surface roughness thereof. As the result, six kinds of particles having respective compositions, surface roughness, average crystal grain sizes and amorphousizing ratios shown in Table 1, were obtained. Cold accumulating materials were then prepared as Examples 24-28 and Reference Example 12 by using each kind of particles.

Refrigeration capacity of each of the cold accumulating materials was measured in the same manner as in the Example 7. The results are shown in Table 1.

As is clear from the results shown in Table 1, specific heat characteristics of the cold accumulating materials (Examples 20-23) composed of $HoCu_2$ particles are considerably improved with increase of ratio of amorphous phase in the particles, resulting in a considerable increase of refrigeration capacity.

Even in the case that the values of surface roughness are the same, the cold accumulating materials of Example 28 having an amorphous phase in the particles has a excellent refrigerating capacity twice greater than that of Reference Example 12.

Example 29

As a Example 29, molten metal comprising neodymium (Nd) having a purity of 99.9% was processed by quenching solidification using a particle manufacturing apparatus based on the REP (Rotating Electrode Process) method.

By the way, REP method is a particle manufacturing method comprising the steps of: preparing a solid-like rotating electrode formed of particle materials; supplying a high temperature flow to the rotating electrode being rotated at a high speed; melting the particle materials to form molten metal and simultaneously dispersing the molten metal; and rapidly cooling and solidifying the molten metal in an inert gas atmosphere to form fine spherical particles. Wherein, inert gases such as He gas having a considerable cooling effect are generally used in the method.

As processing condition in this Example, the outside diameter of the rod-shaped rotating electrode was set to 20 mm, length of the rotating electrode was set to 150 mm and the number of revolutions thereof was set to 30,000 rpm, respectively.

As the result, magnetic particles having a particle size of 0.1 to 2 mm and having a aspect ratio of 1.3 or less were thereby obtained at a yield of 80% or higher with respect to the total amount of the molten metal.

Each of the obtained magnetic particles has an almost spherical shape, and the surface of each particle was formed specularly and smoothly. The average crystal grain size in each particle was 50 $\mu$m.

The thus obtained particles were formed into a cold accumulating material. After the cold accumulating material was packed in the GM refrigerator 30, refrigeration capacity of the material was measured in the same manner. The result is shown in Table 1 represented hereunder.

TABLE 1

| Sample | Composition | Particle Size & Proportion (mm) | (wt %) | Aspect Ratio & Proportion (—) | (wt %) | Surface Roughness $R_{max}$ ($\mu$m) | Average Crystal Grain Size ($\mu$m) | Amorphousizing Ratio (%) | Refrigeration Capacity (W) | Particle Manufacturing Method |
|---|---|---|---|---|---|---|---|---|---|---|
| Example 7 | Er$_3$Ni | 0.1~2 | 80 | 1.3 or less | 80 | 1 | 5 | 0 | 5.1 | RDP (He-gas cooling) |
| Example 8 | " | " | 80 | " | 75 | " | " | " | 3.5 | RDP (He-gas cooling) |
| Reference Example 3 | " | " | 80 | " | 60 | " | " | " | 0.9 | RDP (He-gas cooling) |
| Example 9 | " | " | 75 | " | 80 | " | " | " | 4.2 | RDP (He-gas cooling) |
| Example 10 | " | " | 75 | " | 75 | " | " | " | 2.7 | RDP (He-gas cooling) |
| Reference Example 4 | " | " | 75 | " | 60 | " | " | " | 0.5 | RDP (He-gas cooling) |
| Reference Example 5 | " | " | 60 | " | 80 | " | " | " | 0.8 | RDP (He-gas cooling) |
| Reference Example 6 | " | " | 60 | " | 75 | " | " | " | 0.6 | RDP (He-gas cooling) |
| Reference Example 7 | " | " | 60 | " | 60 | " | " | " | 0.1 | RDP (He-gas cooling) |
| Example 11 | Er$_3$Ni | 0.1~2 | 80 | 2 or less | 80 | 1 | 5 | 0 | 4.5 | RDP (He-gas cooling) |
| Example 12 | " | " | " | 3 or less | " | " | " | " | 3.9 | RDP (He-gas cooling) |
| Example 13 | " | " | " | 4 or less | " | " | " | " | 2.8 | RDP (He-gas cooling) |
| Reference Example 8 | " | " | " | 6 or less | " | " | " | " | 0.6 | RDP (He-gas cooling) |
| Example 14 | " | 0.01~3 | 80 | 1.3 or less | " | " | " | " | 4.2 | RDP (He-gas cooling) |
| Example 15 | " | " | " | 2 or less | " | " | " | " | 3.7 | RDP (He-gas cooling) |
| Example 16 | " | " | " | 3 or less | " | " | " | " | 2.8 | RDP (He-gas cooling) |
| Example 17 | " | " | " | 4 or less | " | " | " | " | 1.9 | RDP (He-gas cooling) |
| Reference Example 9 | " | " | " | 6 or less | " | " | " | " | 0.1 | RDP (He-gas cooling) |
| Example 18 | Er$_3$Ni | 0.1~2 | 80 | 1.3 or less | 80 | 3 | " | " | 2.7 | RDP + Etching |
| Example 19 | " | " | " | " | " | 8 | " | " | 1.8 | RDP + Etching |
| Reference Example 10 | " | " | " | " | " | 15 | " | " | 1.2 | RDP + Etching |
| Example 20 | Er$_3$Ni | 1~1.2 | 80 | 1.3 or less | 80 | 1 | 5 | 0 | 3.3 | RDP (He-gas cooling) |
| Example 21 | " | " | " | " | " | " | 50 | " | 3.2 | RDP (Ar-gas cooling) |
| Example 22 | " | " | " | " | " | " | 200 | " | 3.0 | RDP (low pressurized Ar-gas cooling) |
| Example 23 | " | " | " | " | " | " | 500 | " | 2.9 | RDP (in vacuum) |
| Reference Example 11 | " | " | " | " | " | " | 600 | " | 1.2 | RDP (in vacuum) heat treatment |
| Example 24 | HoCu$_2$ | 0.1~2 | 80 | 1.3 or less | 80 | 5 | 5 | 0 | 1.5 | RDP |
| Example 25 | " | " | " | " | " | 5 | 2 | 10 | 1.7 | Double Role |

TABLE 1-continued

| Sample | Composition | Particle Size & Proportion (mm) | Particle Size & Proportion (wt %) | Aspect Ratio & Proportion (—) | Aspect Ratio & Proportion (wt %) | Surface Roughness $R_{max}$ (μm) | Average Crystal Grain Size (μm) | Amorphousizing Ratio (%) | Refrigeration Capacity (W) | Particle Manufacturing Method |
|---|---|---|---|---|---|---|---|---|---|---|
| Example 26 | " | " | " | " | " | 5 | 1 | 20 | 2.8 | Double Role Method |
| Example 27 | " | " | " | " | " | 5 | 0.8 | 50 | 3.2 | Double Role Method |
| Example 28 | Er₃Ni | " | " | " | " | 8 | 0.5 | 10 | 3.7 | Double Role Method + Etching |
| Reference Example 12 | " | " | " | " | " | 8 | 50 | 0 | 1.8 | RDP + Etching |
| Example 29 | Nd | 0.1~2 | 80 | 1.3 or less | 80 | 1 | 50 | 0 | 3.1 | REP |

As is apparent from Table 1, refrigerating capacity of the cold accumulating material in accordance with Example 29 was 3.1 W. Accordingly, it is comfirmed that the cold accumulating efficiency is 5 times and more greater in comparison with that of conventional popular cold accumulating materials.

In accordance with the cold accumulating material and the manufacture method of the present invention, as described above, rare earth elements having a large volumetric specific heat in an extremely low temperature range are used and a molten metal containing such elements is rapidly solidified to form particles used as a cold accumulating material, thereby improving the cooling effect of the refrigerator in the extremely low temperature range.

In particular, since the magnetic particles are prepared by a molten metal quenching method, there is substantially no possibility of occurrence of segregation in each particle or non-uniformity of the structure thereof. The mechanical strength and the chemical characteristics of the magnetic particles are therefore improved remarkably as compared with magnetic particles prepared by the conventional plasma spray method. Accordingly, the magnetic particles of the present invention are free from the risk of being finely pulverized and, hence, the risk of a reduction in the refrigerator performance even when used as a cold accumulating material for a long time.

The particles of the present invention are generally spherical and their surfaces are formed specularly and very smoothly. It is thereby possible to set a high density at which the magnetic particles are packed in the cold accumulating unit as well as to greatly reduce the resistance to passage of the refrigerant. Substantially no defects including small cracks which make the particles breakable are formed in the particle surfaces. The life of the cold accumulating material can therefore be remarkably extended.

Moreover, the dispersion of the size of magnetic particles prepared by the molten metal quenching method and the dispersion of the ratio of the major diameter to the minor diameter thereof are extremely smaller than those attained by the conventional plasma spray method. Therefore, the need for classification is reduced and the yield of product particles relative to the raw material is increased to about 90 to 95%, thereby remarkably reducing the manufacture cost of the cold accumulating material.

What is claimed is:

1. A cold accumulating material, comprising:
a set of particles having a total weight and a particle size of 0.01 to 3 mm, wherein each particle contains at least one kind of rare earth element selected from a group consisting of Y, La, Ce, Pr, Nd, Pm, Sm, Eu, Gd, Tb, Dy, Ho, Er, Tm and Yb, and surface roughness of said particles is not greater than 10 μm in terms of a maximum height $R_{max}$.

2. A cold accumulating material according to claim 1, wherein the surface roughness of said particles is not greater than 5 μm in terms of the maximum height $R_{max}$.

3. A cold accumulating material according to claim 1, wherein an average crystal grain size of the particles is 0.5 mm or smaller.

4. A cold accumulating material according to claim 1, wherein at least a part of an alloy structure of said particles is formed of an amorphous phase.

5. A cold accumulating material according to claim 1, wherein the proportion of particles having small defects having a length of 10 μm or longer is 30% or smaller by weight relative to the total weight of said particles.

6. A cold accumulating material according to claim 1, wherein the content of each of impurities including O, N, Al, Si and H contained in said particles is 2000 ppm or less.

* * * * *